(12) United States Patent
Harvey et al.

(10) Patent No.: US 10,118,101 B2
(45) Date of Patent: Nov. 6, 2018

(54) SYSTEMS AND METHODS FOR CROWD-SOURCED GAME STRATEGY

(71) Applicant: Electronic Arts Inc., Redwood City, CA (US)

(72) Inventors: Roy Harvey, Maitland, FL (US); Robert Lee Hyder, Lake Mary, FL (US); Mathew Daniel White, Deltona, FL (US); Jacob Landis Cossairt, Oviedo, FL (US)

(73) Assignee: ELECTRONIC ARTS, INC., Redwood City, CA (US)

( * ) Notice: Subject to any disclaimer, the term of this patent is extended or adjusted under 35 U.S.C. 154(b) by 0 days.

(21) Appl. No.: 15/483,856

(22) Filed: Apr. 10, 2017

(65) Prior Publication Data

US 2017/0274287 A1 Sep. 28, 2017

Related U.S. Application Data

(63) Continuation of application No. 14/321,603, filed on Jul. 1, 2014, now Pat. No. 9,616,345.

(51) Int. Cl.
| | |
|---|---|
| *A63F 9/24* | (2006.01) |
| *A63F 13/798* | (2014.01) |
| *A63F 13/67* | (2014.01) |
| *A63F 13/816* | (2014.01) |
| *A63F 13/822* | (2014.01) |
| *A63F 13/837* | (2014.01) |

(52) U.S. Cl.
CPC ............ *A63F 13/798* (2014.09); *A63F 13/67* (2014.09); *A63F 13/816* (2014.09); *A63F 13/822* (2014.09); *A63F 13/837* (2014.09)

(58) Field of Classification Search
CPC ........................ A63F 13/798; A63F 2300/807
See application file for complete search history.

(56) References Cited

U.S. PATENT DOCUMENTS

| | | |
|---|---|---|
| 2003/0125107 A1 | 7/2003 | Cannon |
| 2003/0157985 A1* | 8/2003 | Shteyn .................... A63F 13/10 463/42 |

(Continued)

*Primary Examiner* — Steve Rowland
(74) *Attorney, Agent, or Firm* — Knobbe, Martens, Olson & Bear, LLP

(57) ABSTRACT

Various embodiments provide systems and methods that collect data regarding game strategy decisions by human players during video game, and utilize the collected data to either adjust or replace behaviors of computer players and/or suggest game strategies to human players during video game sessions. The game strategy decisions may be harvested from human-vs-human and human-vs-computer video game sessions. The data may be harvested from online-connected video game sessions, which may be hosted over an online video game network. Depending on the embodiment, the harvested data can include information regarding game strategies used by players during the video game sessions, the game contexts in which the game strategies were respectively used, and the results achieved by the respective use of the game strategies. Systems and methods described herein may facilitate a computer player having behavior that is (at least partially) "crowd-sourced" based on game strategies used by online-connected video game sessions.

18 Claims, 8 Drawing Sheets

(56) References Cited

U.S. PATENT DOCUMENTS

2008/0102916 A1  5/2008  Kovacs et al.
2009/0137298 A1  5/2009  Bedingfield et al.
2012/0302328 A1  11/2012 Walker et al.
2014/0236331 A1  8/2014  Lehmann et al.
2016/0001183 A1  1/2016  Harvey et al.

* cited by examiner

SYSTEMS AND METHODS FOR CROWD-SOURCED GAME STRATEGY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Technical Field

The present invention(s) generally relate to gameplay and, more particularly, relate to systems and methods for crowd-sourcing game strategy and for utilizing crowd-sourced game strategy in video games.

2. Description of Related Art

Multi-player video games are often configured to include one or more computer-based video game players ("computer players" or "AI players") against which one or more human video game players ("human players") can play. Traditionally, computer players are included to facilitate single (human) player mode in the multi-player video game (e.g., used as a substitute for another human player), or to enhance the gaming experience of human players with opponents of varying difficulty. Computer players are generally pre-programmed to mimic the game play of a human opponent of a predetermined skill level (e.g., novice, average, or expert).

With respect to video games involving selection and use of game strategies during gameplay (e.g., plays called in sports video games, such as a baseball video game), the computer player usually selects and uses game strategies based on pre-programmed behavior and rules. With respect to a football video game, an example of selecting and using a game strategy can include a (human or computer) player selecting a defensive play for a goal-line game situation or making a player substitutions to implement an aggressive running attack. With respect to a baseball video game, an example of selecting and using a game strategy can include a (human or computer) player shifting the outfield for a left-handed batter or intentionally walking a known-power hitter.

Though the pre-programmed behavior and rules of the computer player may be periodically updated, the behavior of the computer player is generally static and does not evolve over time, as would the behavior of a human player.

SUMMARY

Various embodiments provide systems and methods that harvests data regarding game strategy decisions by human players during video game sessions (e.g., millions of online connected video game sessions), and utilizes the harvested data to either adjust or replace behaviors of computer players and/or suggest game strategies to human players during video game sessions. The game strategy decisions may be harvested from human-vs.-human and human-vs.-computer video game sessions. The data may be harvested from online-connected video game sessions, which may be hosted over an online video game network. Depending on the embodiment, the harvested data can include information regarding game strategies used by (human or computer) players during the video game sessions, the game contexts in which the game strategies were respectively used, and the results achieved by the respective use of the game strategies.

Systems and methods described herein may facilitate a computer player having behavior that is (at least partially) "crowd informed" or "crowd-sourced" based on game strategies used by online-connected video game sessions, which can number in hundreds of thousands or millions. The data regarding game strategies can be harvested for a particular video game title or for a set of video game titles.

According to some embodiments, systems and methods (e.g., at a server) receive first data from a first client device, where the first data relates to a first game strategy used by a first game player in a first game context of a first video game session (e.g., hosted over an online game network), and the first video game session is between the first game player and at least a second game player. The first video game session may involve a video game being played between the first and second game players. The game context can provide, for example, the current parameters of the video game (e.g., title and version of the video game, current settings of the video game), the current situation of the video game (hereafter, game situation) (e.g., current state of gameplay, identity of teams playing if applicable, current quarter of the game if applicable, current score, time left on the clock, etc.), information regarding game players playing in the video game (e.g., are they human or computer players, player skill levels, player online rating, etc.), and the like. For some embodiments, the first game player is at the first client device, the second game player is at a different client device, and the first video game session is established over a network connection between the first client device and the different client device.

Depending on the embodiment, the video game may be a sports video game and the first game context may comprise a state of the sports game at a specific time. For example, the video game may be a football video game and the first game context comprises a current offensive team, a current defensive team, a current score, a current game quarter, time left in the current game quarter, a current down, current yards to completion, current line of scrimmage, one or more players on the field, current position of one or more players, current weather, current location, or current time of day. Where the video game is a football video game, the game strategies involved may relate to football-related playcalls (e.g., a call for an offensive, defensive, pass-related, run-related, special teams, kickoff, on-side kick, or punt return play). Depending on the embodiment, the video game may be a role-playing game (RPG), a real-time strategy (RTS) game, a simulation, a first person shooter (FPS) game, or an adventure game.

The systems or methods may update a game strategy dataset based on the first data, where the first data at least includes an identity of the first game strategy and an association between the first game context and the first game strategy, the game strategy dataset including a set of one or more previous game strategies used in a set of one or more previous game contexts (e.g., in previous video game sessions). The first data may further include a set of game results achieved during the first video game session based on use of the first game strategy.

The systems or methods may identify in the game strategy dataset a set of one or more relevant game strategies based on a set of one or more game strategy criteria. In some embodiment, the use of the one or more game strategy criteria permits the filtering of the game strategies in the game strategy dataset (e.g., filter based on results achieved in the video game, or the video game players who used the game strategies) before such game strategies are provided to a client device for use as suggested game strategies. Depending on the embodiment, the set of one or more game strategy criteria may relate to a result achieved during past use of a given game strategy, past use by a set of one or more video game players (e.g., players having a certain skill level or having a particular online ranking), when or how often a given game strategy was used. The systems or methods may analyze game strategies in the game strategy dataset, and may identify in the game strategy dataset a set of one or more relevant game strategies based on a set of one or more game strategy criteria and the analysis results.

The systems or methods may provide a second client device with second data regarding the set of one or more relevant game strategies. The second client device may be configured to use the second data to provide a set of one or more relevant game strategies for use in a second game context of a second video game session (e.g., hosted over an online game network) involving the same video game as the first video game session. The second data may be provided to the second client device in advance of the second video game session beginning between the third game player and the fourth game player. Additionally, the second data may at least include a set of one or more identities of the relevant game strategies and a set of game contexts associated with the relevant game strategies.

The second video game session may be between a third game player and at least a fourth game player. In some embodiments, the third game player is at the second client device, the fourth game player is at a different client device, and the second video game session is established over a network connection between the second client device and the different client device.

The second client device may be further configured to identify the set of one or more suggested game strategies in the set of one or more relevant game strategies based on a second game context of the second video game session, and provide the set of one or more suggested game strategies to the third game player for use in the second game context. In some embodiments, the set of one or more suggested game strategies are those game strategies, in the set of one or more relevant game strategies, having an associated game context that is at least similar to the second game context.

In some embodiments, the third game player is a computer video game player, and the third game player may automatically use at least one game strategy, in the set of one or more suggested game strategies, in the second game context.

In some embodiments, the third game player is a human video game player, and the second client device may provide the set of one or more relevant game strategies for use in the second video game session by suggesting at least one game strategy, in the set of one or more suggested game strategies, to the third game player as an available game strategy for use in the second game context.

According to some embodiments, systems and methods (e.g., at a client device) receive, from a server, first data regarding a set of one or more relevant game strategies identified in a game strategy dataset based on a set of one or more game strategy criteria. The game strategy dataset may include including a set of one or more previous game strategies used in a set of previous game contexts. The set of one or more relevant game strategies may be associated with a video game, and may be identified (e.g., at the server) based on a set of one or more game strategy criteria, such as those described herein. The systems and methods may identify a set of one or more suggested game strategies, in the set of one or more relevant game strategies, based on the first data and on a current game context of a video game session (e.g., at a client device) between a first game player and at least a second game player. In some embodiments, the video game session involves the same video game as the video game with which the set of one or more relevant game strategies are associated. The systems and methods may provide the set of one or more suggested game strategies for use by the first game player in the current game context, the first game player being a human game player. Additionally, the systems and methods may provide the set of one or more suggested game strategies for use by the first game player in the current game context, the first game player being a computer game player, the third game player automatically using at least one game strategy from the set of one or more suggested game strategies.

According to some embodiments, systems and methods (e.g., at a server) receive, from a first client device, first data regarding a first game strategy used, by a first game player, in a first game context of a first video game session between the first game player and a second game player, the first video game session involving a video game. The systems and methods may update a game strategy dataset based on the first data, the first data including an identity of the first game strategy and an association between the first game context and the first game strategy, the game strategy dataset including a set of one or more previous game strategies used in a previous game context of a given video game session. The systems and methods may receive, from a second client device, second data regarding a second game context of a second video game session between a third game player and a fourth game player, the second video game session involving the video game. The systems and methods may identify a set of one or more suggested game strategies from the game strategy dataset based on the second data. The systems and methods may provide the second client device with third data regarding the set of one or more suggested game strategies, the second client device being configured to use the third data to provide the set of one or more suggested game strategies for use by the third game player in the second game context, the third game player being a human game player. Additionally, the systems and methods may provide the second client device with third data regarding the set of one or more suggested game strategies, the second client device being configured to use the third data to provide the set of one or more suggested game strategies for use by the third game player in the second game context, the third game player being a computer game player that automatically uses at least one game strategy from the set of one or more suggested game strategies.

Various embodiments provide for a computer program product comprising computer instruction codes configured to cause the computer system to perform various operations described herein.

Other features and aspects of various embodiments will become apparent from the following detailed description, taken in conjunction with the accompanying drawings, which illustrate, by way of example, the features of such embodiments.

BRIEF DESCRIPTION OF THE DRAWINGS

Various embodiments are described in detail with reference to the following figures. The drawings are provided for purposes of illustration only and merely depict some embodiments. These drawings shall not be considered limiting of the breadth, scope, or applicability of embodiments.

DETAILED DESCRIPTION OF EMBODIMENTS

Figure 1:
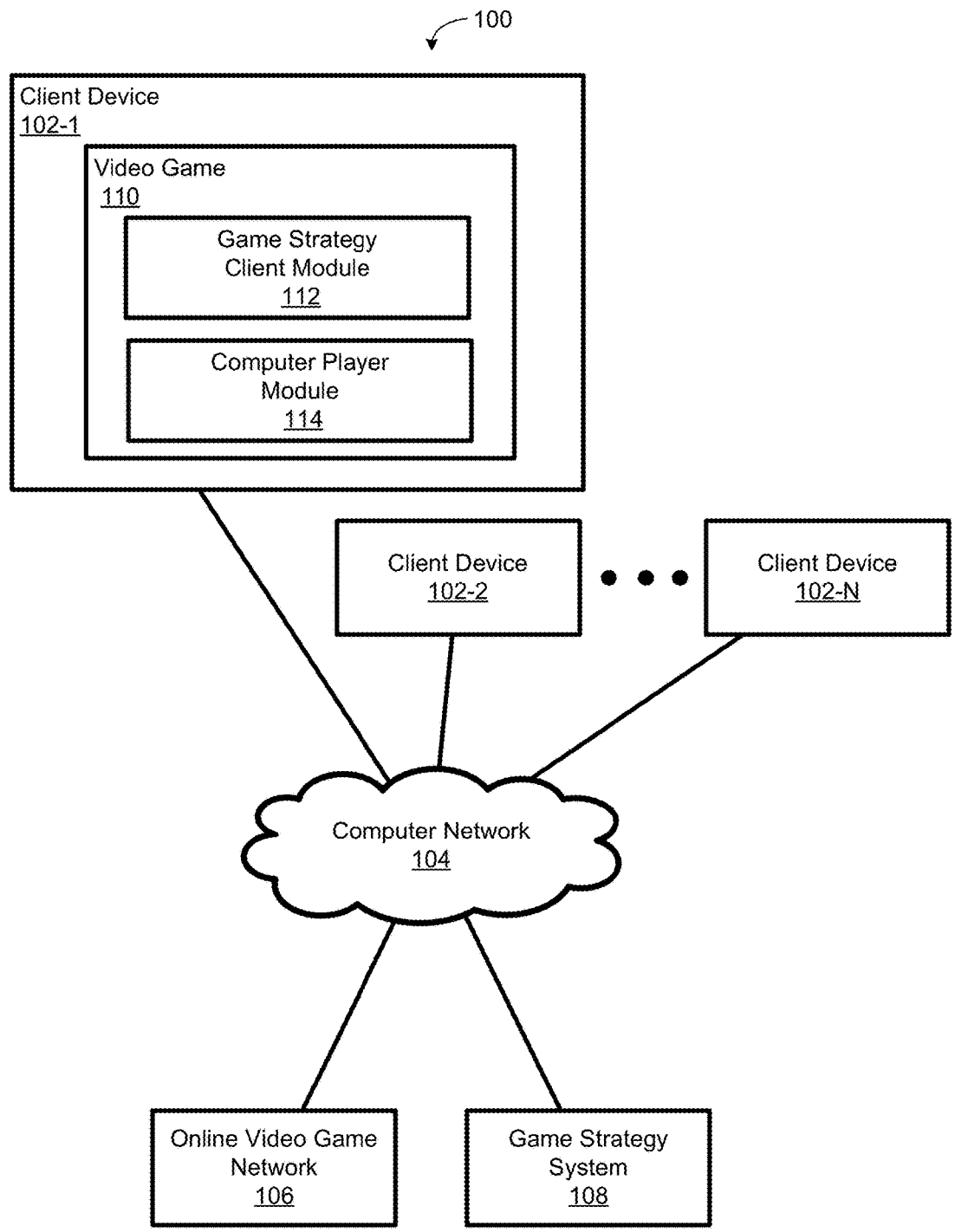
FIG. 1 is a block diagram illustrating an example environment utilizing a game strategy system in accordance with various embodiments.

Various embodiments provide for systems and methods that provide "crowd informed"/"crowd-sourced" game strategy suggestions to human video game players (hereafter, also referred to as "human players") or computer video game players (hereafter, also referred to as "computer players" or "AI players") participating in a video game session. As used herein, "game strategy" will be understood to include any form of strategy utilized in a video game, and may differ between different video game titles or video game types. Additionally, as used herein, a video game session will be understood to involve a video game (e.g., a specific video game title) and a human player playing against at least one other human player, against at least one computer player, or both. Systems and methods described herein may be implemented with respect to a sports video game, such as soccer, (American) football, baseball, hockey, tennis, or golf, and may be further implemented with respect to a non-sports video game, such as a role-playing game (RPG) (e.g., MMORPG), a real-time strategy (RTS) game, a simulation, a first person shooter (FPS) game, or an adventure game. The video game may be, in whole or in part, a turn-based game in which players take turns reviewing and then selecting from a set of available game strategies to execute during gameplay.

As an example, systems and methods may be implemented with a football video game in which a human player has an opportunity to select an offensive/defensive play (e.g., between hikes) and control a player on the field after a game strategy is selected. Such systems or methods may provide one or more playcall suggestions to a human player when the human player is provided with an opportunity to select a playcall for use during a video game session. Additionally, such systems or methods may provide one or more playcall suggestions to a computer player configured to automatically select and utilize one or more playcalls from the playcall suggestions during a video game session. The play call suggestion may include, for example, an effective defensive play for a specified offensive group (e.g., 1RB-1TE-3WR) or an effective offensive play for a specific game situation (e.g., 9 minutes remaining in 4th quarter and the offense is 3rd and long).

In some embodiments, systems or methods generate game strategy suggestions using game context information provided through (human or computer) player telemetry data generated by a video game. Such telemetry data can include game context information regarding game situations and gameplay by players in particular game contexts. For a video game session (involving a specific video game), the telemetry data can describe the current game context experienced by the two or more players participating in the video game session, and can further describe one or more game strategies utilized by the players in the game context. For instance, for the current game context in a football video game, the telemetry data can describe the current game situation, which may include the current down, distance to go (for a completion), current absolute yard line, the identity of an offensive play utilized, identify of a defensive play utilized, results of an offensive or defensive play utilized (e.g., net yards gained by an offensive play utilized), and the like. Using the telemetry data and the like as sources for game context information, systems and methods can sample and save (e.g., into a game strategy dataset): game strategies utilized during game play between players (e.g., save at a database maintained by a server), the game contexts in which such game strategies are utilized, and results associated with such game strategies. Eventually, the sampled and saved data can be used to provide one or more suggested game strategies during future game sessions, based on current game contexts (e.g., current game situations) of those future game sessions. Certain embodiments are implemented with respect to an online video game network or service, such as one offered by Electronic Arts®, that may be capable of sampling and saving game strategies utilized by a plurality of video game sessions communicatively coupled to the online video game network/service. Such an online video game network or service may be one that facilitates head-to-head video game play between two or more remote human players (e.g., over the Internet), which may be located at different video game consoles. An online video game network/service may permit certain embodiments to sample and save 500,000 or more game strategies, and their respective results, each day from game play between players (e.g., over a video game network), thereby utilizing the game strategy decisions of the "crowd" to drive the game strategy suggestions provided to human or computer players.

The sampled and saved game strategies can be analyzed (e.g., to determine the effectiveness of the sampled and saved game strategies) and can provide a set of one or more relevant game strategies (e.g., an list of playcalls ordered according to effectiveness) from which a set of one or more suggested game strategies can be identified for use in a particular game context of a video game session. For some embodiments, sampled and saved game strategies harvested from past video game sessions (e.g., via an online video game network) are analyzed (e.g., at a server), and a set of one or more relevant game strategies is identified (e.g., identify game strategies used by players of a certain rank or skill level, relevant to a particular video game title, or that achieved particular results) based on the analysis. Thereafter, the set of one or more relevant game strategies may be saved to a database or file (e.g., JSON file) for future use in video game sessions as a crowd-source for game strategies (e.g., online video game community-source) from which a set of one or more suggested game strategy can be provided to players. The set of one or more relevant game strategies may comprise, for example, a list of suggested game strategies ordered according to game results achieved based on their respective use (e.g., by game players) in past video game sessions. The file can eventually be provided (e.g., from a server) to a client device that is hosting a human player for a video game session. The set of one or more relevant game strategies may be sent to the client device in advance of or near the beginning of a video game session.

Once the video game session has commenced, the client device can filter the set of one or more relevant game strategies, according to the current game context in the video game session (e.g., current game situation), to identify a set of one or more suggested game strategies, which can then be provided for selection by a human player (e.g., display top ranked playcall suggestions next to list of possible playcalls available for player selection), or automatically utilized by a computer player (against which the human player is currently playing). The manner in which the set of one or more relevant game strategies at the client device (e.g., in the file) are filtered can depend on a number of factors, including the resources of the client device, the skill level of the players involved (e.g., human player's skill level or computer player's difficulty level), various video game settings, and the preferences of participating human players.

FIG. 1 is a block diagram illustrating an example environment 100 utilizing a game strategy system in accordance with various embodiments. As shown in FIG. 1, the example environment 100 can comprise client devices 102-1 through 102-N (hereafter, collectively referred to as "client devices 102"), an online video game network 106, a game strategy system 108, and a computer network 104 communicatively coupling together each of the client devices 102, the online video game network 106, and the game strategy system 108. It will be understood that for some embodiments, the components or the arrangement of components may differ from what is depicted in FIG. 1. In accordance with some embodiments, the computer network 104 may be implemented or facilitated using one or more local or wide-area communications networks, such as the Internet, WiFi networks, WiMax networks, private networks, public networks, and the like.

Each of the client devices 102, the online video game network 106, and the game strategy system 108 may be implemented using one or more digital devices, which may be similar to the digital devices discussed later with respect to FIG. 8. For example, one or more of the client devices 102 may be any form of computing device, such as a video game console, capable of executing a video game, presenting a video game user interface through a display coupled to the computing device, receiving user input from a video game player (e.g., entered through a game controller coupled to the computing device), and communicating with various entities in the example environment 100 through the computer network 104. For instance, through the computer network 104, the client device 102-1 can request and subsequently receive data regarding a set of game strategies from the game strategy system 108. For some embodiments, such a set of game strategies enables the client device 102-1 (or like) to provide a set of one or more suggested game strategies to a human game player or computer game player, at the client device 102-1, during a video game session for use in a particular game context.

One or more of the client devices 102 may include a video game console, a portable gaming console, a mobile phone, a tablet computing device, a laptop, a desktop computer, personal digital assistant, a thin client, a set-top box, a portable multi-media player, or any other type of network accessible user device known to those of skill in the art. Further, one or more of the online video game network 106 and game strategy system 108 may comprise of one or more servers, which may be operating on or implemented using one or more cloud-based resources (e.g., System-as-a-Service [SaaS], Platform-as-a-Service [PaaS], or Infrastructure-as-a-Service [IaaS]). Depending on the embodiment, a video game session can involve one or more video game players at one of the client devices 102 and can further involve one or more video game players at another of the client devices 102. As described herein, a given video game player may be human game player or computer game player. Additionally, a copy of the video game may be executing at one or more of the client devices 102 during the video game session. Further, a copy of the video game may be executing at (e.g., hosted on) a server, such as the online video game network 106.

According to some embodiments, one or more of the client devices 102 is communicatively couple to the game strategy system 108, and may do so by way of the online video game network 106. Through such a coupling, the one or more of the client devices 102 can provide, and the game strategy system 108 can receive, and subsequently store, data regarding game strategies used by one or more video game players, at the one or more of the client devices 102, during a video game session involving a video game. Additionally, through such a coupling, the one or more of the client devices 102 may request, and subsequently receive, a set of one or more relevant game strategies for use, at the one or more client devices 102, as a set of one or more suggested game strategies. Depending on the embodiment, the set of one or more suggested game strategies may be provided to a human game player (e.g., at the client device 102-1), for review, selection, and use within a game context of a video game session. The set of one or more suggested game strategies may be provided to a computer game player (e.g., operating at the client device 102-1) for analysis, automatic selection, and use (e.g., against a human player at the client device 102-1) within a game context of a video game session.

According to some embodiments, the one or more of the client devices 102 is communicatively coupled to the game strategy system 108, and such coupling may be by way of the online video game network 106. Through such a coupling, the game strategy system 108 may receive, and subsequently store, data from the one or more client devices 102 regarding game strategy used by a human game player at the one or more of the client device 102 during a video game session. Additionally, through such a coupling, the one or more client devices 102 can request, and subsequently receive, data regarding a set of one or more relevant game strategies that can be used at the one or more client devices 102 as suggested game strategies during video game session. Depending on the embodiments, the suggested game strategies may be provided to a human game player at the one of the client devices 102, who may review, select, and use one of the suggested game strategies in a game context during a video game session. Depending on the embodiments, the suggested game strategies may be provided to a computer game player operating at the one of the client devices 102, who may review, automatic selection, and use one of the suggested game strategies (e.g., against a human game player at the one of the client device 102) in a game context during a video game session.

As shown in FIG. 1, the client device 102-1 comprises a video game 110 that includes a game strategy client module 112 and a computer player module 114. Those skilled in the art will appreciate that for some embodiments, either the game strategy client module 112 or the computer player module 114 may be separate from the video game 110. The video game 110 may represent a copy of video game software that relates to specific video game title, that executes on the client device 102-1, and that is configured to present a user with an user interface of the video game 110 (i.e., video game user interface) through a display coupled to the client device 102-1. The client device 102-1 may utilize the video game user interface to facilitate interaction between a human game player at the client device 102-1 and the video game 110, which may include the review, selection, and use of game strategies suggested to the human game player.

The game strategy client module 112 may be configured to facilitate providing game strategies, used at the client device 102-1 by one or more human players, to the game strategy system 108. The game strategy client module 112 may be configured to facilitate providing suggested game strategies to computer or human game players at the client device 102-1. Those skilled in the art will appreciate that the game strategy client module 112 may be implemented as part of the video game 110 (as shown) and provide one or more suggested game strategies to the video game 110, or may be implemented as a separate module, which may provide one or more suggested game strategies to the video game 110 and one or more other video games. Depending on the embodiment, the game strategy client module 112 may receive game player preferences from one or more human game players at the client device 102-1 and provide game suggested game strategies in accordance with those preferences. The game strategy client module 112 may monitor a current game context during a video game session involving the video game 110, and may utilize the current game context to provide suggested game strategies to a computer or human game player.

According to some embodiments, the game strategy system 108 may receive data regarding game strategy usage from the client device 102-1 as follows. The game strategy system 108 may receive, and the game strategy client module 112 may provide the game strategy system 108 with, first data relating to a set of one or more game strategies used by a first human game player at the client device 102-1. The set of one or more game strategies may be used in a first game context of a first video game session (e.g., hosted over the online video game network 106) between the first human game player and at least one second video game player. The second video game player may be a computer game player operating the client device 102-1, another computing device (e.g., the online video game network 106), or another one of the client devices 102. Additionally, the second video game player may be a human game player playing at the client device 102-1 with the first human game player, or at another one of the client devices 102. The first video game session may involve a specific video game being played between the first human game player and the at least one second game player. For some embodiments, the copy of the video game 110 at the client device 102-1 facilitates the first human game players participation in the first video game session, and may further facilitate participation of the at least one second game player when the second game player is another human game player at the client device 102-1 participating with the first human player or when the second game player is a computer game player implemented via the computer player module 114. Those skilled in the art will appreciate that additional copies of the specific video game or other software related to the specific video game may be required (e.g., at individual the client devices 102 or on the online video game network 106) to facilitate the first video game session between the client device 102-1 and video game players at other client devices 102. As described herein, the first video game session may be established over a network connection between the client device 102-1 and one or more of the other client devices 102, and may further involve the online video game network 106.

As described herein, the first game context can provide the current parameters of the video game, such as title and version of the video game 110 or the current settings of the video game 110, which can include the difficulty level of in-video game environment and the skill level of any computer game opponents. The first game context can provide the current game situation in the video game 110, which may describe the current state of gameplay and describe the one or more of teams playing where applicable (e.g., football, baseball or soccer video game), identify the current quarter in the game where applicable, current score where applicable, time spent or time left in the game where applicable, and the like. The first game context can also provide information regarding video game players participating in the video game, such whether they are human or computer game players, their player skill levels, their player online rating, and the like.

Depending on the embodiment, the video game 110 may be a sports video game and the first game context may comprise the current game situation in the sports game at a particular time. For example, where the video game 110 is a football video game, and the first game context comprises a current offensive team, a current defensive team, a current score, a current game quarter, time left in the current game quarter, a current down, current yards to completion, current line of scrimmage, one or more players on the field, current position of one or more players, current weather, current location, or current time of day. Additionally, where the video game 110 is a football video game, the game strategies involved may relate to football-related playcalls (e.g., a call for an offensive, defensive, pass-related, run-related, special teams, kickoff, on-side kick, or punt return play). Those skilled in the art will appreciate that the video game 110 may be non-sport game, such as a role-playing game (RPG), a real-time strategy (RTS) game, a simulation, a first person shooter (FPS) game, or an adventure game, and that the game strategies involved may differ between different types of video games or different video game titles.

Subsequent to receiving first data from the game strategy client module 112, the game strategy system 108 may update a game strategy dataset (e.g., stored at the game strategy system 108) based on the first data. The first data may at least include an identity of the first game strategy (e.g., name or a unique identifier) and an association between the first game strategy and the first game context in which the first game strategy was utilized by the first human game player. The game strategy dataset may be maintained by the game strategy system 108, and may include a set of one or more previous game strategies used in a set of one or more previous game contexts (e.g., in previous video game sessions involving two or more of the client devices 102). The first data may further include a set of game results achieved by the first human game player during the first video game session based on use of the first game strategy.

The game strategy system 108 may identify in the game strategy dataset a set of one or more relevant game strategies based on a set of one or more game strategy criteria. In some embodiment, the use of the one or more game strategy criteria permits the filtering of the game strategies in the game strategy dataset (e.g., filter based on results achieved in the video game, or the video game players who used the game strategies) before such game strategies are provided to a client device for use as suggested game strategies. In doing so, the client devices 102 can be provided with a dataset smaller than the game strategy dataset maintained by the game strategy system 108. This not only saves on the amount of data that needs to be transferred by the game strategy system 108 to each of the client devices 102 (e.g., at the start of or in advance of a new video game session), but can reduces the amount of time needed by the client devices 102 (e.g., the game strategy client module 112) to analyze the current game context, identify a set of suggested game strategies, and provide that set to one or more of the video game players.

Depending on the embodiment, the set of one or more game strategy criteria may relate to a result achieved during past use of a given game strategy (e.g., to determine the effectiveness of using the given game strategy, maybe in a specific game context), past use by a set of one or more video game players (e.g., video game players having a certain skill level or having a particular online ranking), when or how often a given game strategy was used. The game strategy system 108 may analyze game strategies in the game strategy dataset, and may identify in the game strategy dataset a set of one or more relevant game strategies based on a set of one or more game strategy criteria and the analysis results.

Thereafter, the game strategy system 108 may provide the client device 102-2 with second data regarding the set of one or more relevant game strategies, and may do so before or at the commencement of a new second video game session by the client device 102-2 between two or more video game player, such as a third game player and a fourth game player, at least one of which is a human game player. The client device 102-2 may comprise its own game strategy client module, which may facilitate the reception of the second data from the game strategy system 108. The set of one or more relevant game strategies may include those game strategies that are preferred for suggestion to video game players at the client device 102-2.

The client device 102-2 may be configured to use the second data to provide a set of one or more suggested game strategies for use in a second game context of a second video game session (e.g., hosted over an online game network) involving the same video game as the first video game session. The set of suggested game strategies may be smaller than the set of one or more relevant game strategies provided to the client device 102-2 via the second data. As noted herein, the second data may be provided to the second client device in advance of the second video game session beginning between the third game player and the fourth game player. To provide the set of one or more relevant game strategies to the client device 102-2, the second data may at least include a set of one or more identities of the relevant game strategies and a set of game contexts associated with the relevant game strategies. Depending on the embodiment, the second client device 102-2 may identify the set of one or more suggested game strategies, in the set of one or more relevant game strategies, based on a second game context of the second video game session. The client device 102-2 may further provide the set of one or more suggested game strategies to one of the third game player, the fourth game player, or both, for use in the second game context. Where both the third game player and the fourth game player are provided with a set of one or more suggested game strategies, the set of one or more suggested game strategies for the third game player may be different from the set of one or more suggested game strategies for the fourth game player. Accordingly, for some embodiments, the process of identifying the set of one or more suggested game strategies for the third game player is independent of the process of identifying the set of one or more suggested game strategies for the fourth game player. In some embodiments, the set of one or more suggested game strategies are those game strategies, in the set of one or more relevant game strategies, having an associated game context that is at least similar to the second game context.

In some embodiments, the game strategy system 108 may first receive, from the client device 102-2, third data regarding the second game context of a second video game session between the third game player and the fourth game player. Thereafter, the game strategy system 108 may identify the set of one or more suggested game strategies from the game strategy dataset, on behalf of the client device 102-2, based on the third data that provides the second game context. The game strategy system 108 may provide the client device 102-2 with fourth data regarding the set of one or more suggested game strategies. Subsequently, the client device 102-2 may use the fourth data to provide the set of one or more suggested game strategies for use by the third game player in the second game context.

The computer player module 114 may be one configured to implement one or more computer game players at the client device 102-1 during a video game session involving the video game 110. Depending on the embodiment, the computer player module 114 may implement the one or more computer game players according to video game settings (e.g., video game player preferences), which may determine, for instance, the skill level of the computer game player (e.g., novice or expert), whether the computer game player can utilize suggested game strategies provided by the game strategy client module 112, and other behavior by the one or more computer game players implemented by the computer player module 114. For some embodiments, the computer player module 114 implements the one or more computer game players such that they mimic the behavior of a human game player having a particular skill level. Computer game players implemented by the computer player module 114 may behave according to rules and other pre-programmed settings. By using the suggest game strategies provided by the game strategy client module 112, the one or more computer game players implemented by the computer player module 114 may better mimic behavior of a human player, and do so according to behavior of the human players in an online video game community.

The online video game network 106 may represent an online game service to which the one or more client devices 102 communicatively couples before, after, or during a video game session involving the video game 110. For some embodiments, the online video game network 106 is one that facilitates the collection of game strategies used in by human game players at the one or more client devices 102. In some embodiments, the online video game network 106 facilitates a human game player at one of the client devices 102 to play the video game 110 against another of the client devices 102. Depending on the embodiment, the online video game network 106 may be one implemented or maintained by the publisher, developer, or seller of the video game 110. Additionally, depending on the embodiment, the online video game network 106 may execute the video game 110 on behalf of one or more human video game players at the one or more client devices 102. Further, the online video game network 106 may implement one or more computer game players for a video game session involving one or more of the client devices 102.

The game strategy system 108 may be configured to facilitate collection of data regarding video game strategies used during one or more video game sessions involving two or more human game players, or one or more human game players against one or more computer game players. The game strategy system 108 may analyze collected data regarding video game strategies, may identify a set of one or more relevant video game strategies for use as suggest video game strategies, and may provide the set of one or more relevant video game strategies to one or more of the client devices 102 for use by computer or human game players at the one or more client devices 102.

Figure 2:
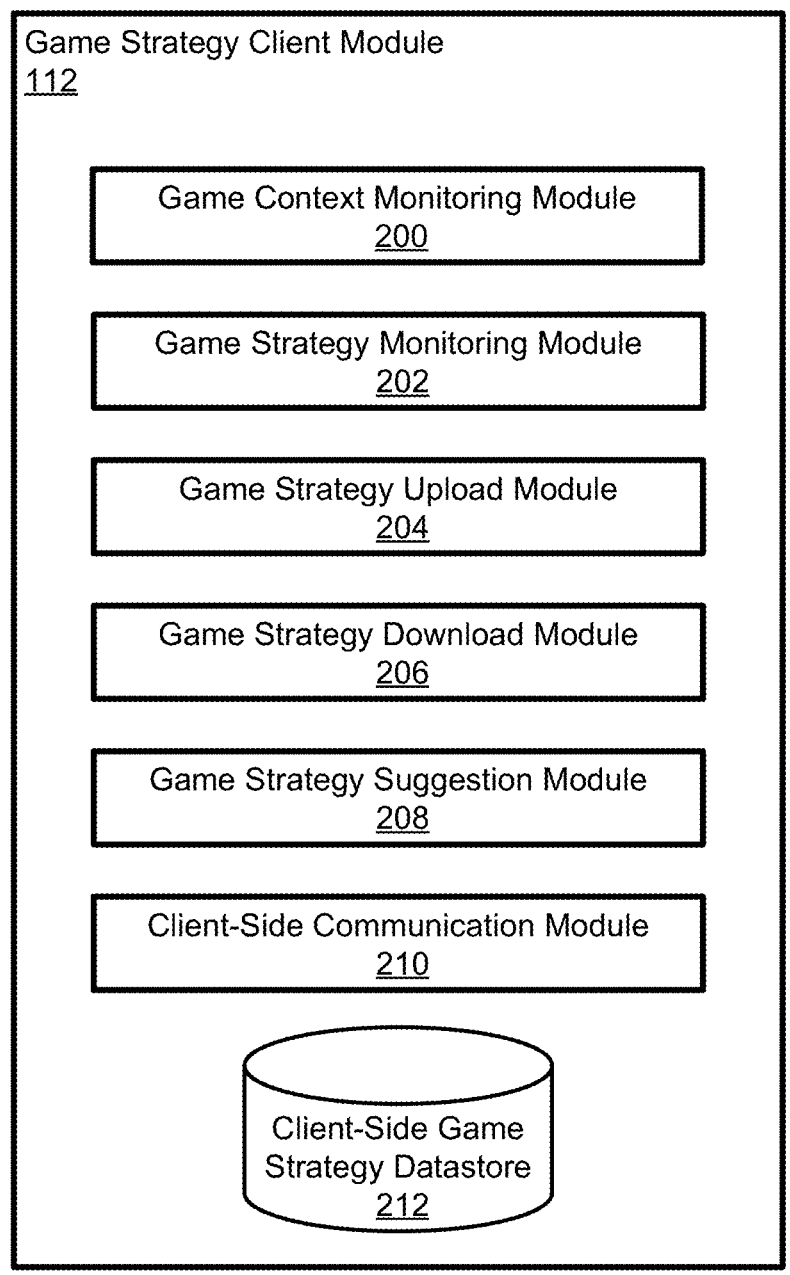
FIG. 2 is a block diagram of a game strategy client module in accordance with some embodiments of the invention.

FIG. 2 is a block diagram of the game strategy client module 112 in accordance with some embodiments of the invention. As shown in FIG. 2, the game strategy client module 112 can comprise a game context monitoring module 200, a game strategy monitoring module 202, a game strategy upload module 204, a game strategy download module 206, a game strategy suggestion module 208, a client-side communication module 210, and a client-side game strategy datastore 212. Those skilled in the art will appreciate that components of the game strategy client module 112, and functionality of those components, may differ between various embodiments.

The game context monitoring module 200 may be configured to monitor or otherwise determine a game context of a video game session involving a video game (e.g., the video game 110) executing at a client device, such as client device 102-1. The game context monitoring module 200 may be configured to provide data regarding the game context, which may be provided with game strategy usage data that is reported to a game strategy system (e.g., the game strategy system 108) by a client device (e.g., the client device 102-1), or which may be utilized when identifying a set of one or more suggested game strategies to be provided to one or more video game players at the client device. The game context monitoring module 200 may determine the game context at the time a particular game strategy is selected and utilized by a video game player at the client device (e.g., the client device 102-1).

The game strategy monitoring module 202 may be configured to monitor or otherwise determine which game strategies are selected and used, by one or more video game players at a client device (e.g., the client device 102-1), in a game context of a video game session involving a video game (e.g., the video game 110) executing at the client device. The game strategy monitoring module 202 may be configured to provide data regarding the game strategies used to a game strategy system (e.g., the game strategy system 108), which may collect in a game strategy dataset. The data regarding the game strategies may further include results (e.g., in-game results) achieved by use of the game strategies, by which the game strategy system may determine the effectiveness of the game strategies.

The game strategy upload module 204 may be configured to upload, or otherwise send, to a game strategy system (e.g., the game strategy system 108) data regarding the game strategies used, as provided by the game strategy monitoring module 202. As noted above, the data may include results achieved by use of the game strategies. The game strategy upload module 204 may also be configured to configured to upload, or otherwise send, to the game strategy system data regarding the game contexts associated with the usage of those game strategies, as provide by the game context monitoring module 200.

The game strategy download module 206 may be configured to download a set of one or more game strategies provided by a game strategy system (e.g., the game strategy system 108). As noted herein, the game strategy system may provide the game strategy download module 206 with a set of one or more relevant game strategies, from which a client device (e.g., the client device 102-1) may identify a set of one or more suggested game strategies for a video game player, or may provide the game strategy download module 206 with a set of one or more suggested game strategies identified by the game strategy system for the client device. Depending on the embodiment, the game strategy download module 206 may be responsible for requesting a set of one or more game strategies from the game strategy system, and may do so at any time before, at begging of, or during a video game session.

The game strategy suggestion module 208 may be configured to provide a video game player at a client device (e.g., the client device 102-1) with a set of one or more suggested game strategies. Depending on the embodiment, the game strategy suggestion module 208 may be responsible for identifying the set of one or more suggested game from a set of relevant game strategies provided to the client device by the game strategy system, and may do so based on a current game context provided by the game context monitoring module 200. In some embodiments, the game strategy suggestion module 208 may rely on the game strategy system to identify the set of suggested game strategies on behalf of the client device. In some such embodiments, the game strategy system identifies the set of suggested game strategies based on game context data the game strategy client module 112 passes to the game strategy system (e.g., as provided by the game context monitoring module 200).

The client-side communication module 210 may be configured to facilitate communication of data between the game strategy client module 112 and a game strategy system (e.g., the game strategy system 108). In some embodiments, the client-side communication module 210 may directly communicate data with the game strategy system, may communicate data by way of an online video game network, or may communicate data by some combination both. In doing so, the client-side communication module 210 may utilize one or more a network connections with the game strategy system or the online video game network to communicate the data.

The client-side game strategy datastore 212 may be configured to facilitate storage and future retrieval of data regarding one or more game strategies at the game strategy client module 112. Depending on the embodiment, the data stored by the client-side game strategy datastore 212 can include data regarding one or more game strategies utilized by a video game player at a client device (e.g., the client device 102-1), data regard game contexts associated with usage game strategies utilized by a video game player at the client device, data regarding one or more relevant game strategies provided by the game strategy system (from which the client device can identify a set of one or more suggested game strategies), or data regarding one or more suggested game strategies provided to the client device by the game strategy system for a given game context. The client-side game strategy datastore 212 may further include data regarding settings, game player preferences, or other information that can affect the behavior or operation of the game strategy client module 112.

Figure 3:
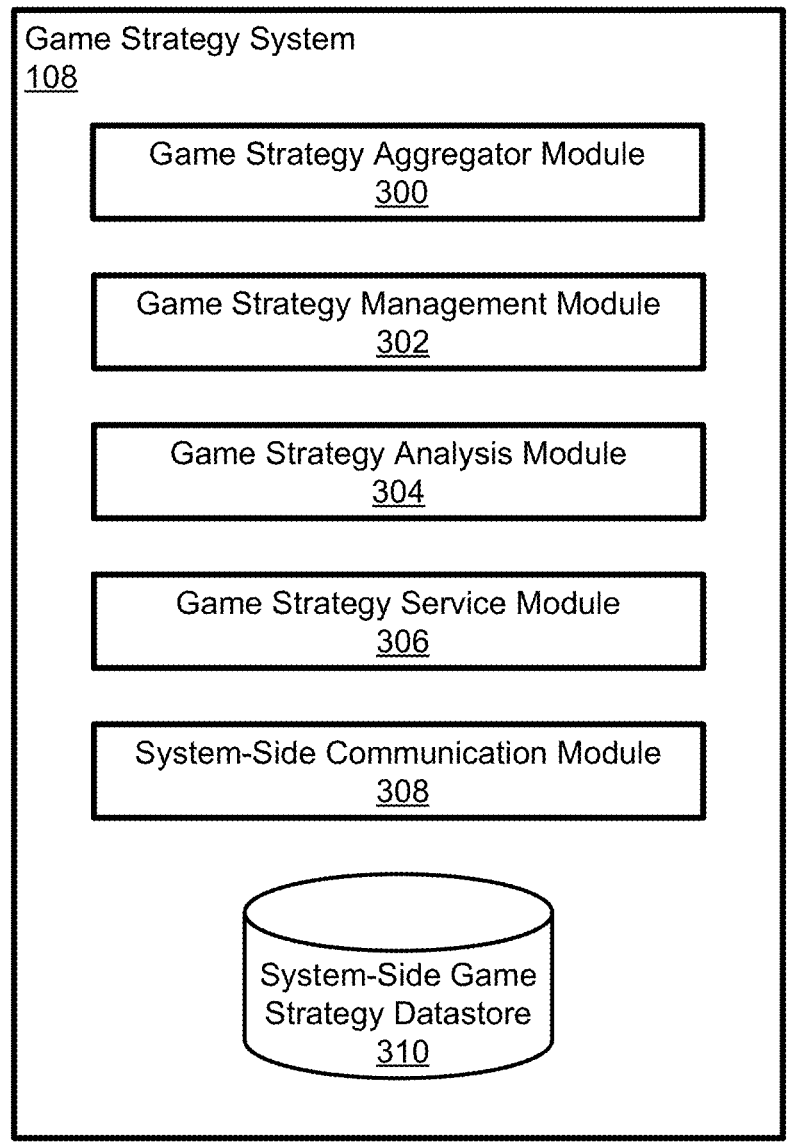
FIG. 3 is a block diagram of a game strategy system in accordance with some embodiments of the invention.

FIG. 3 is a block diagram of the game strategy system 108 in accordance with some embodiments of the invention. As shown in FIG. 3, the game strategy system 108 can comprise a game strategy aggregation module 300, a game strategy management module 302, a game strategy analysis module 304, a game strategy service module 306, a system-side communication module 308, and a system-side game strategy datastore 310. Those skilled in the art will appreciate that components of the game strategy system 108, and functionality of those components, may differ between various embodiments.

The game strategy aggregation module 300 may be configured to facilitate collection of data regarding game strategies from one or more client devices (e.g., the client devices). For some embodiments, as client devices involved in video game sessions provide the game strategy aggregation module 300 with data regarding usage of game strategies by the respective video game players they support. As described herein, such data may be accompanied by data regarding game contexts in which those game strategies were utilized, and data regarding results achieved by usage of those game strategies. Depending on the embodiment, the game strategy aggregation module 300 may collect data regarding game strategy and the like on during the video game session (e.g., at or near real-time or on a periodic basis), or at sometime after the video game session has concluded.

The game strategy management module 302 may be configured to manage data regarding game strategies, which may include the storage, search, or retrieval of such data. As the game strategy aggregation module 300 collects data from the client devices, the game strategy management module 302 may utilize the system-side game strategy datastore 310 for storage of such data. For some embodiments, the game strategy management module 302 can index the game strategy data maintained by the game strategy system 108 according to a number of different indices, including associated game context information and game strategy result information. The game strategy management module 302 can assist the game strategy service module 306 in servicing requests from the client devices for sets of one or more game strategies, assist the game strategy analysis module 304 in analyzing data regarding data collected by the game strategy aggregation module 300 regarding game strategies, and can otherwise facilitate identification of a set of one or more relevant or suggested game strategies for one or more client devices.

The game strategy analysis module 304 may be configured to analyze data collected regarding game strategies (hereafter also referred to as "sampled game strategies") from one or more client devices (e.g., the client device 102-1), and may be further configured to identify a set of one or more game strategies to provide to a client device for suggestion to a video game player. Depending on the embodiment, the game strategy analysis module 304 may utilize statistics, data mining, telemetry, or the like to identify a set of one or more relevant game strategies (e.g., best game strategies for suggestion) from which one or more client devices 102 can provide a set of one or more suggested game strategies (e.g., based on a current game context) to one or more game players at the one or more client devices 102. The analysis data that results from the game strategy analysis module 304 may be stored in the system-side game strategy datastore 310 for storage of such data, and may be utilized by the game strategy analysis module 304 in identifying a set of one or more relevant or suggested game strategies to provide the client devices. The game strategy analysis module 304 may utilize a set of game strategy criteria, in view of the analysis data, to identify the set of one or more relevant or suggested game strategies. The set of game strategy criteria used may be determined based on or defined according to the algorithm utilized by the game strategy analysis module 304 analyze and identify the set of one or more relevant or suggested game strategies.

For some embodiments, the game strategy analysis module 304 performs an algorithm that analyzes sampled game strategies (e.g., saved in a game strategy dataset) by parsing the sampled game strategies to identify a game strategy type, an offense or defense personnel group (e.g., special teams), or a formation name associated with one or more of the sampled game strategies. For instance, with respect to a football video game, the game strategy type identified for the sampled game strategies may include an run, playcall, pass playcall, offense playcall, defense playcall, clock management playcall, special teams playcall (e.g., kick off, punt, field goal), on-side kick playcall, and fake kick playcall. The resulting parsed data can be used in subsequent analysis steps performed by the algorithm.

In some embodiments, the algorithm for analyzing sampled game strategies comprises generating a set of analysis results (e.g., average results) for each of the sampled game strategies (e.g., set of averages yards gained for each offensive or defensive playcall). With respect to defensive game strategies, the algorithm may comprise identifying a set of defensive game strategies used against each sampled offensive game strategy. The algorithm may further comprise determining results achieved against the identified defensive set of game strategies, determining the number of times the identified set of defensive game strategies has been utilized (e.g., in the online gaming community), or determining the number of times the results from the identified set of defensive game strategies exceeds the effectiveness of the sampled offensive game strategy. For instance, with respect to a football video game, the algorithm may determine results achieved against the identified set of defensive game strategies by determining the total number of yards gained against the identified defensive game strategies, average yards gained per play, or the offensive effectiveness percentage (e.g., calculated based on total effective count/total sample size). With respect to offensive game strategies, the algorithm for analyzing sampled game may determine effectiveness for each sampled offensive game strategy based on one or more of the game context, the type of offensive game strategy (e.g., pass, run, special teams playcall), and the results of the offensive game strategy (e.g., actual results observed during gameplay and the analysis of those results).

For some embodiments, the algorithm determines effectiveness by determining whether use of a given game strategy or given type of game strategy achieves a certain result in the video game. For instance, with respect to a football video game, the algorithm for analyzing sampled game strategies may determine effectiveness for each sampled offensive game strategy by: for goal line or red zone pass playcall, determining whether the playcall results in a $1^{st}$ down or a gain of at least 8 yards; for goal line or red zone non-pass playcall, determining whether the playcall results in a $1^{st}$ down or a gain of at least 4 yards; for a $1^{st}$ down or $2^{nd}$ down pass playcall, determining whether the playcall results in a $1^{st}$ down or a gain of at least 8 yards; for a $1^{st}$ down or $2^{nd}$ down non-pass playcall, determining whether the playcall results in a $1^{st}$ down or a gain of at least 4 yards; or for a $3^{rd}$ down or $4^{th}$ down playcall, determine whether the playcall results in a $1^{st}$ down. For some embodiments, the algorithm for analyzing sampled game strategies comprises aggregating individual game context-based results for a given game strategy and using those aggregated results to calculate an average result achieved for the given game strategy.

In some embodiments, a set of game strategies ordered according to their effectiveness serves as the set of one or more relevant game strategies from which future video game sessions can provide one or more suggested game strategies to human or computer players. In some embodiments, the algorithm for analyzing sampled game strategies comprises filtering or ignoring those game strategies having certain results or other characteristics (e.g., used by top ranked players), thereby providing a set of one or more relevant game strategies that meet a set of specific criteria. Additionally, for some embodiments, the algorithm generates a set of the most effective defensive game strategies (e.g., defensive playcalls) against a specific offensive game strategy (e.g., offensive playcalls), a set of the most effective offensive game strategies against a defensive game strategy, or both.

For instance, with respect to a football video game, the algorithm for analyzing sampled game strategies may determine a set of most effective defensive playcalls against a given offensive playcall by doing one or more of the following: ignoring play results for offensive playcall relating to fake kicks or clock management (e.g., QB kneel, or QB spike); ignoring play results for defensive playcalls relating to a goal line defensive formation or special teams (e.g., kicks, such as punt returns or field goal block); for each offensive playcall, sort a set of defensive playcalls by a total sample size and ignore or discard those having lowest 25% of results with the least number of total samples; and for each offensive playcall, sort a set of defensive playcalls by offense effective percentage (e.g., ascending: lower to higher) and average yards gained (e.g., ascending: lower to higher) to determine the most effective defensive playcalls against each the offensive playcall.

In another example involving a football video game, the algorithm for analyzing sampled game strategies may determine a set of most effective defensive playcalls for a specified defensive formation (e.g., Nickel formation) by doing one or more of the following: aggregate individual game context-based results for a given game strategy and use those aggregated results to calculate an average result achieved for the given game strategy; ignore playcall results for offensive playcalls associated with special teams (e.g., kicks, such as punt or field goal), fake kicks, or clock management (e.g., QB kneel or QB spike); and for each offensive playcall, create or find a result summary for each defensive playcall used against the offensive playcall.

In another example involving a football video game, the algorithm for analyzing sampled game strategies may determine a set of most effective defensive playcalls for a specified offensive personnel group (e.g. 1RB-1TE-3WR) by doing one or more of the following: aggregate individual game context-based results for a given game strategy and use those aggregated results to calculate an average result achieved for the given game strategy; ignore playcall results for offensive playcalls associated with special teams (e.g., kicks, such as punt or field goal), fake kicks, or clock management (e.g., QB kneel or QB spike); ignore playcall results for defensive playcalls associated with special teams (e.g., kicks, such as punt or field goal); for each offensive playcall, create or find a result summary for the offensive personnel group associated with the offensive playcall; and for each defensive playcall result, add the total result counts to a summary record for the offensive personnel group against each individual defensive playcall. The foregoing can produce the average results for all the individual defensive playcalls against a given offensive personnel group. The algorithm can continue by doing one or more of the following: for each offensive personnel group, sort the list of defensive playcalls by total sample size; discard the lower 25% of results with the least number of total samples; and for each offensive personnel group, sort the list of defensive playcalls by offense effective percentage (e.g., ascending: lower to higher) and average yards gained (e.g., ascending: lower to higher) to determine the most effective defensive playcalls against the offensive personnel group.

In another example involving a football video game, the algorithm for analyzing sampled game strategies may determine a set of most effective defensive playcalls for a specified game situation (e.g., 3rd and Long) by doing one or more of the following: determine playcall result averages for each individual game situation; ignore playcall results for offensive playcalls associated with special teams (e.g., kicks, such as punt or field goal), fake kicks, or clock management (e.g., QB kneel or QB spike); process a separate summary for each game situation; for each game situation, create or find a result summary for the game situation; for each offensive playcall, create a result summary for the offensive playcall results; and for each defensive playcall result, add the total result counts to a summary record in the game situation for the offensive playcall against all defensive playcalls. The foregoing can produce the average results for all the individual offensive playcalls in each game situation. The algorithm can continue by doing one or more of the following: for each game situation, sort the list of offensive playcalls by total sample size; discard the lower 25% of results with the least number of total samples; and for each game situation, sort the list of offensive playcalls by offense effective percentage (e.g., descending: higher to lower) and average yards gained (e.g., descending: higher to lower) to determine the most effective offensive playcalls.

Those skilled in the art will appreciate that the operations and algorithms described above are merely examples that can be utilized with a football video game. Those skilled in the art will further appreciate that for some embodiments, the operations above can be adapted for other game strategies and other video games.

The game strategy service module 306 may be configured to provide a set of game strategies to one or more client devices (e.g., the client device 102-1) for use by one or more human or computer game player involved at video game session at the client devices. For some embodiments, the game strategy service module 306 receives from the client device a request for one or more game strategies. Depending on the embodiment, the request from the client device may provide information regarding a game context of a video game session in which the client device is involved (e.g., the title of the video game 110, the type of video game players involved, specific information regarding the one or more video game players to be provided with the suggested game strategies, etc.), and the game strategy service module 306 may utilize such information to identify the set of one or more relevant game strategies to provided to the client device, or to identify a set of one or more suggested game strategies to be provided to the client device.

The system-side communication module 308 may be configured to facilitate communication of data between the game strategy system 108 and a game strategy client module (e.g., the game strategy client module 112). In some embodiments, the system-side communication module 308 may directly communicate data with the game strategy client module, may communicate data by way of an online video game network, or may communicate data by some combination both. In doing so, the system-side communication module 308 may utilize one or more a network connections with the game strategy client module or the online video game network to communicate the data.

The system-side game strategy datastore 310 may be configured to configured to facilitate storage and future retrieval of data regarding one or more game strategies at the game strategy system 108. Depending on the embodiment, the data stored by the system-side game strategy datastore 310 may store a game strategy dataset from which the game strategy system 108 can provide a set of one or more relevant game strategies or a set of one or more suggested game strategies. The system-side game strategy datastore 310 may include data regarding one or more game strategies utilized by a video game player at a client device (e.g., the client device 102-1), data regard game contexts associated with usage game strategies utilized by a video game player at the client device, data regarding one or more relevant game strategies that can be provided to the client device (from which the client device can identify a set of one or more suggested game strategies), or data regarding one or more suggested game strategies provided to the client device by the game strategy system for a given game context. The system-side game strategy datastore 310 may further include data regarding settings, game player preferences, or other information that can affect the behavior or operation of the game strategy system 108.

Figure 4:
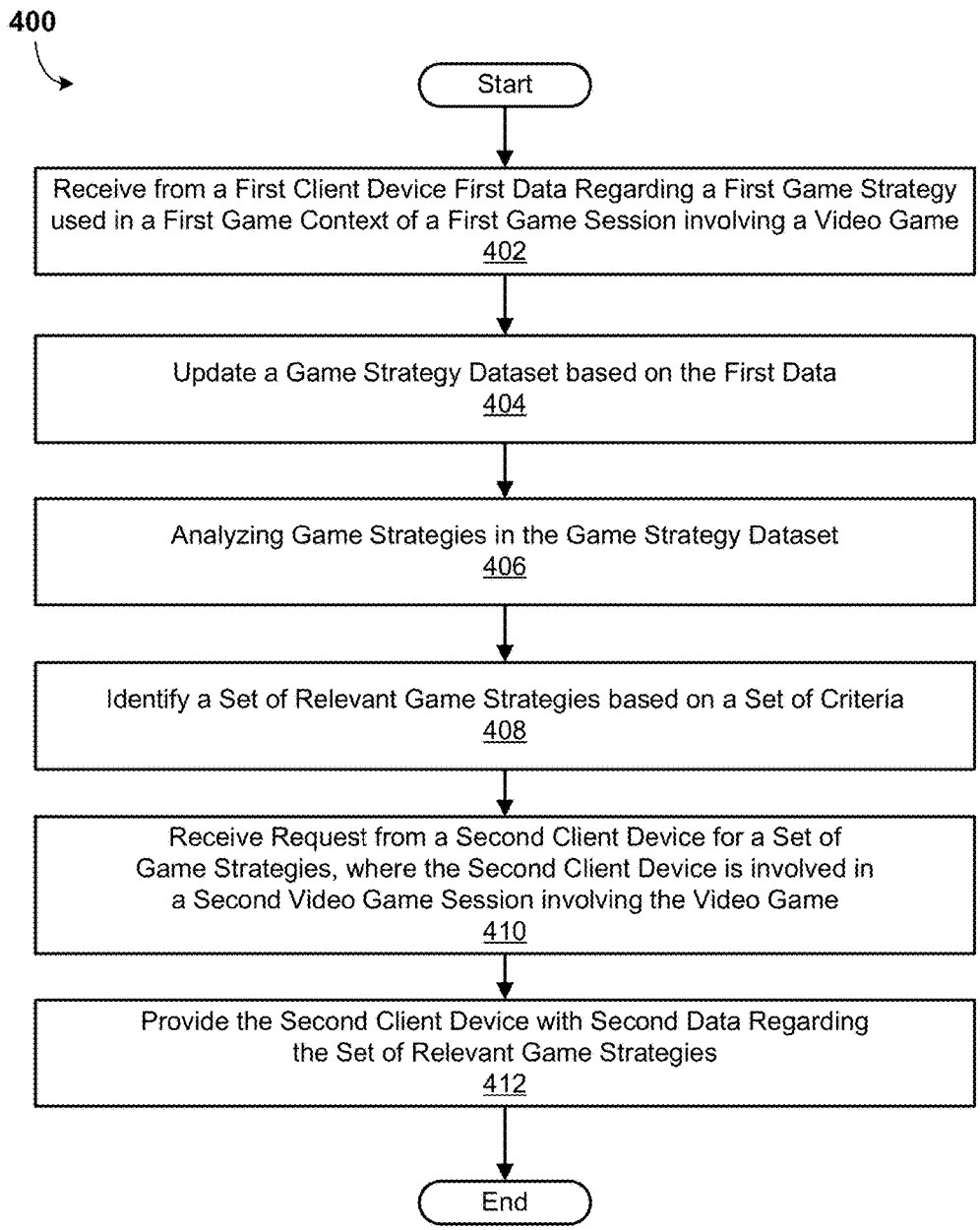
FIG. 4 is a flowchart illustrating an example method for game strategies in accordance with some embodiments of the invention.

FIG. 4 is a flowchart illustrating an example method 400 for game strategies in accordance with some embodiments of the invention. As described below, for some embodiments, the method 400 may perform operations in connection the game strategy system 108. The method 400 may begin at step 402, with the game strategy aggregation module 300 (of the game strategy system 108) receiving from a first client device (e.g., the client device 102-1) first data regarding a first game strategy used in a first game context of a first game session involving a video game (e.g., a specific football video game). The first data may comprise information regarding the first game strategy and one or more other game strategies. The first game strategy may be one used by one or more human players at the first client device in the first game context during the first game session. Depending on the embodiment, the first data received may be in the form of a file, and the first data may include a structured format (e.g., XML or JSON). Additionally, depending on the embodiment, the system-side communication module 308 may facilitate receipt of the first data from the first client device.

At step 404, the game strategy management module 302 may update a game strategy dataset based on the first data. In some embodiments, the first data may at least include an identity of the first game strategy, information regarding a first game context in which the first game strategy is used (e.g., for a video game session involving a football game, parameters such as current quarter, current score, time left in quarter, identity of teams, etc.), and information regarding one or more results achieved by utilizing the first game strategy in the first game context (e.g., for a video game session involving a football game, increase in score, yards gained, etc.). In some embodiments, the system-side game strategy datastore 310 comprises the game strategy dataset, and the system-side game strategy datastore 310 may be implemented using a database or some other means of computer readable data storage. An update to the game strategy dataset may comprise storing, in the game strategy dataset, information regarding the first game strategy in association with the first game context in which it was used. In the event that the game strategy dataset already includes information regarding the first game strategy exists in association with the first game context, such information may be updated based on the first data.

At step 406, the game strategy analysis module 304 may analyze one or more game strategies stored in the game strategy dataset and, at step 408, the game strategy analysis module 304 may identify a set of one or more relevant game strategies based on a set of criteria. As described herein, the game strategy analysis module 304 may be configured to analyze game strategies sampled from one or more client devices (e.g., the client device 102-1), and may be further configured to identify a set of one or more game strategies to provide to a client device for suggestion to a video game player. The game strategy analysis module 304 may utilize a set of game strategy criteria, in view of the analysis data, to identify the set of one or more relevant or suggested game strategies. Additionally, the set of game strategy criteria used may be determined based on or defined according to the algorithm utilized by the game strategy analysis module 304 analyze and identify the set of one or more relevant or suggested game strategies.

At step 410, the game strategy service module 306 may receive, from a second client device (e.g., the client device 102-2), a request for a set of game strategies that the second client device can use in a second video game session in which the second client device is involved. For some embodiments, the second video game session involves the same video game as the first video game session. Depending on the embodiment, the request from the second client device may provide information regarding the video game (e.g., title and version) or, more specifically, the a the second video game session (e.g., information regarding current game mode or a second game context) so that the game strategy service module 306 provides the second client device with game strategies appropriate to the second video game session. Depending on the embodiment, the system-side communication module 308 may facilitate receipt of the request from the second client device.

At operation 412, the game strategy service module 306 may provide the second client device (e.g., the client device 102-2) with second data regarding a set of one or more relevant game strategies, which may have been identified during step 410. Depending on the embodiment, the system-side communication module 308 may enable the game strategy system 108 to send the second data to the second client device.

Though the operations of method 400 may be depicted and described above in a certain order, those skilled in the art will appreciate that the order in which the operations are performed may vary between embodiments, including performing certain operations in parallel. Additionally, those skilled in the art will appreciate that the components described above with respect to the method 400 of the flowchart are merely examples of components that may be used with the method, and for some embodiments other components may also be utilized in some embodiments.

Figure 5:
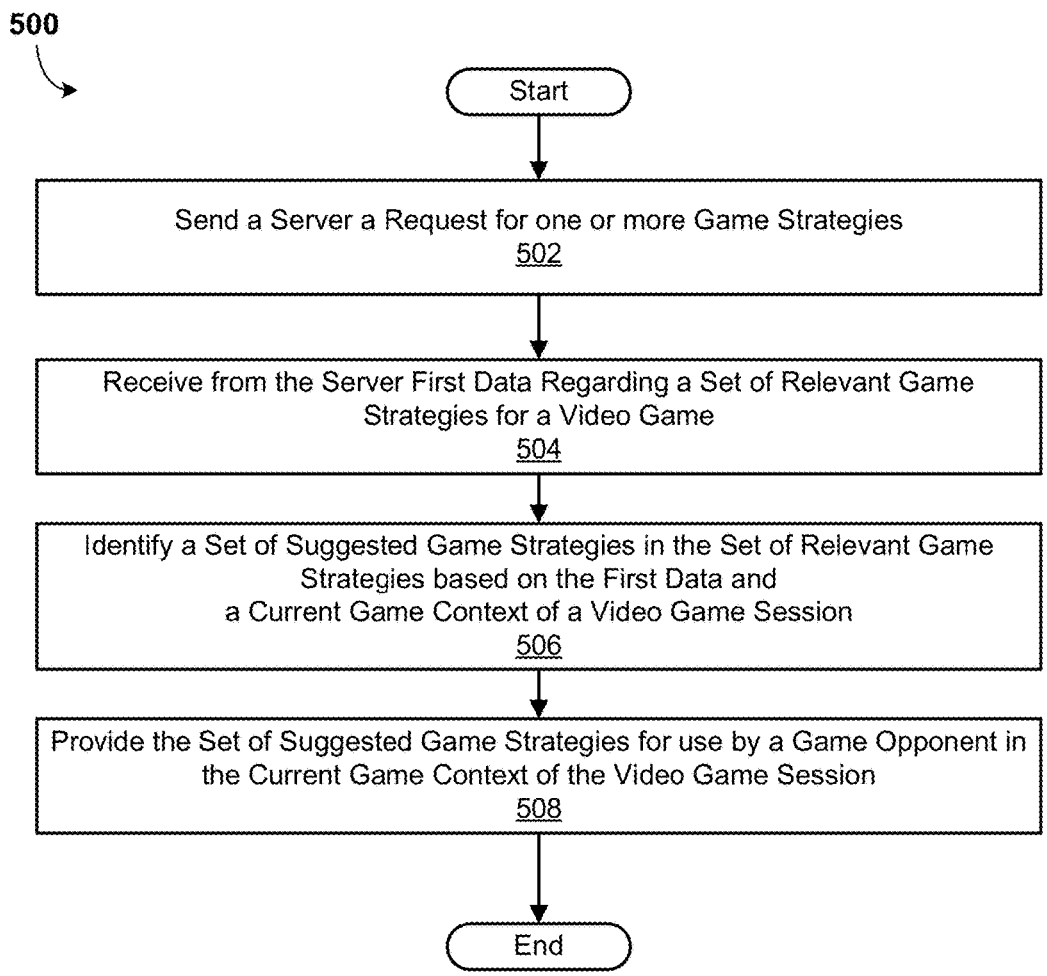
FIG. 5 is a flowchart illustrating an example method for game strategies in accordance with some embodiments of the invention.

FIG. 5 is a flowchart illustrating of an example method 500 for game strategies in accordance with some embodiments of the invention. As described below, for some embodiments, the method 500 may perform operations in connection the game strategy client module 112. The method 500 may begin at step 502 with the game strategy download module 206 sending a request, to a server (e.g., the game strategy system 108), for one or more game strategies. In the request, the game strategy download module 206 may include game context information that enables the game strategy system 108 to identify a set of one or more relevant game strategies (or a set of one or more suggested game strategies) that can be provided to the client device in response to the request.

At step 504, the game strategy download module 206 may receive from the server (e.g., the game strategy system 108) first data regarding a set of one or more relevant game strategies for a video game. Depending on the embodiment, the first data may be received in response to the request sent at step 502, or the first data may be pushed periodically or aperiodically to the game strategy download module 206 from the server (e.g., when the game strategy dataset at the server is updated). At step 506, the game strategy suggestion module 208 may identify a set of one or more suggested game strategies in the set of one or more relevant game strategies based on the first data and a current game context of a video game session. In some embodiments, the video game session involves the video game relating to the set of one or more relevant game strategies received at step 504. At step 508, the game strategy suggestion module 208 may provide the set of one or more suggested game strategies for use by a game player in the current game context of the video game session.

Though the operations of method 500 may be depicted and described above in a certain order, those skilled in the art will appreciate that the order in which the operations are performed may vary between embodiments, including performing certain operations in parallel. Additionally, those skilled in the art will appreciate that the components described above with respect to the method 500 of the flowchart are merely examples of components that may be used with the method, and for some embodiments other components may also be utilized in some embodiments.

Figure 6:
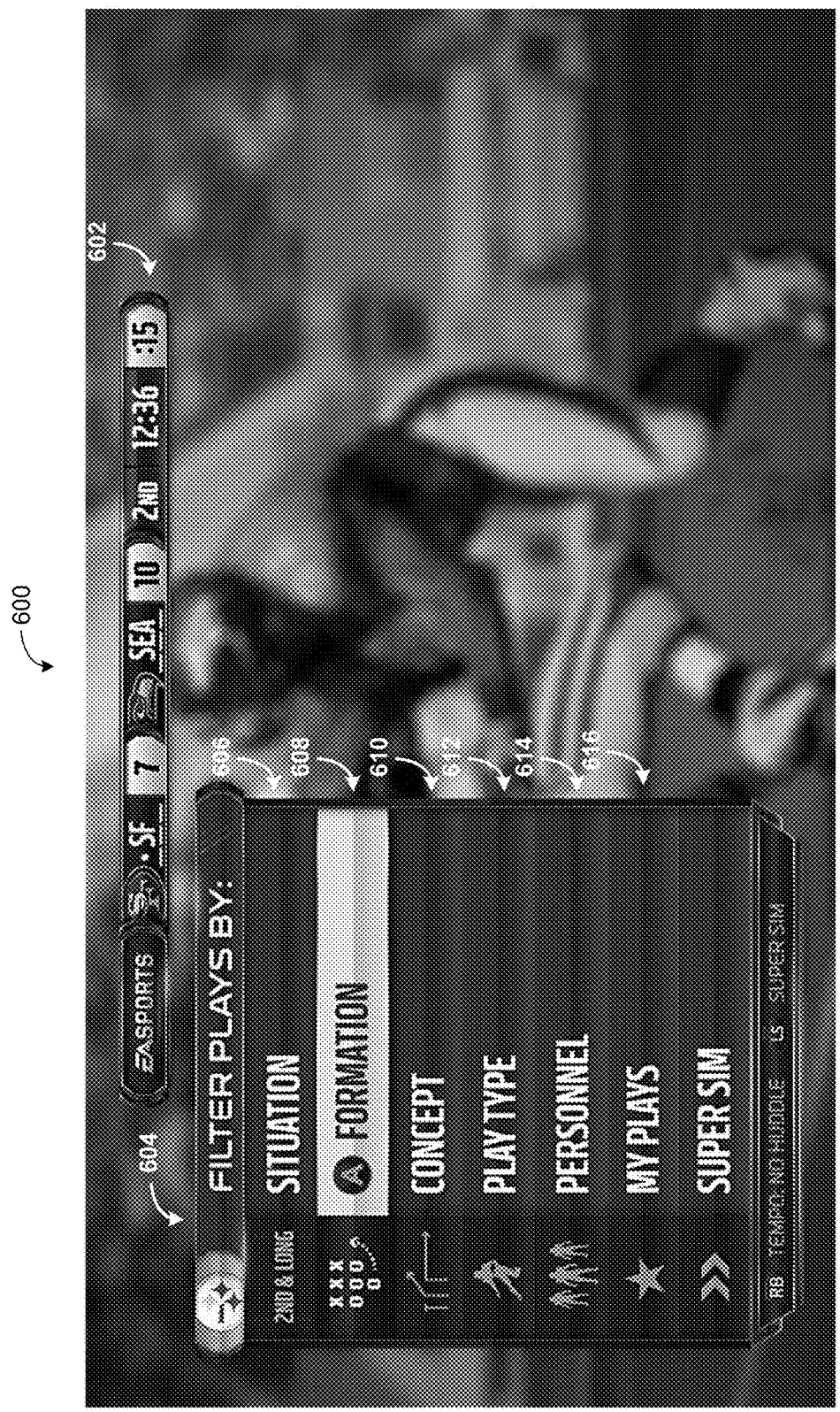
FIG. 6 is a screenshot of an example user interface for accessing playcalls in a video game in accordance with some embodiments of the present invention.

FIG. 6 is a screenshot 600 of an example user interface for accessing playcalls in a video game in accordance with some embodiments of the present invention. The screenshot 600 may be one presented to a human game player during a video game session involving a football video game. The screenshot 600 includes a football game situation bar 602, which can display latest situation in the football game being played. The screenshot 600 further includes a menu 604 for accessing football playcalls that a human game player can call in gameplay during a video game session. For some embodiments, the menu 604 may appear between different footballs plays during the video game session. As shown in FIG. 6, the menu 604 can permit a user to filter football playcalls according to game situation 606, formation 608, concept 610, play type 612, personnel 614, and user preferences 616 (e.g., My Plays).

For some embodiments, the football playcalls provided through the menu 604 includes one or more football playcalls provided by the game strategy system 108, which may be provided through the game strategy client module 112 (e.g., of client device 102-1). As described herein, the set of football playcalls provided to the menu 604 by the game strategy system 108 may be those used in gameplay between two or more game players during previous video game sessions (e.g., over an online video game network). The set of football playcalls provided by the game strategy system 108 may be those relevant to the current video game session, and further may be those that provided favorable results in previous video game sessions (e.g., during video game sessions human player versus human player or human player versus computer player). For instance, the football playcalls provided by the game strategy system 108 may be those crowd-sourced from an online video game network, where football playcalls made during video game sessions involving game players from the online video game network (e.g., online game community). From such an online video game network, the game strategy system 108 may provide the most successful playcalls or playcalls with the best community results (e.g., in terms of average yards gained for an offensive football playcall or average yards prevented for a defensive football playcall). Based on the set of one or more relevant football playcalls provided by the game strategy system 108 to the game strategy client module 112 (e.g., of client device 102-1), the game strategy client module 112 may filter or otherwise identify suggested playcalls from the set of one or more relevant playcalls, and may do based on the current game context (e.g., current game situation, player types involved—human or computer, player skill levels, etc.).

Though the example user interface of FIG. 6 relates to a football video game, those skilled in the art will appreciate that for various embodiments, user interface for accessing playcalls, or other types of game strategies, may differ based on the type of video game or based on the video game title.

Figure 7:
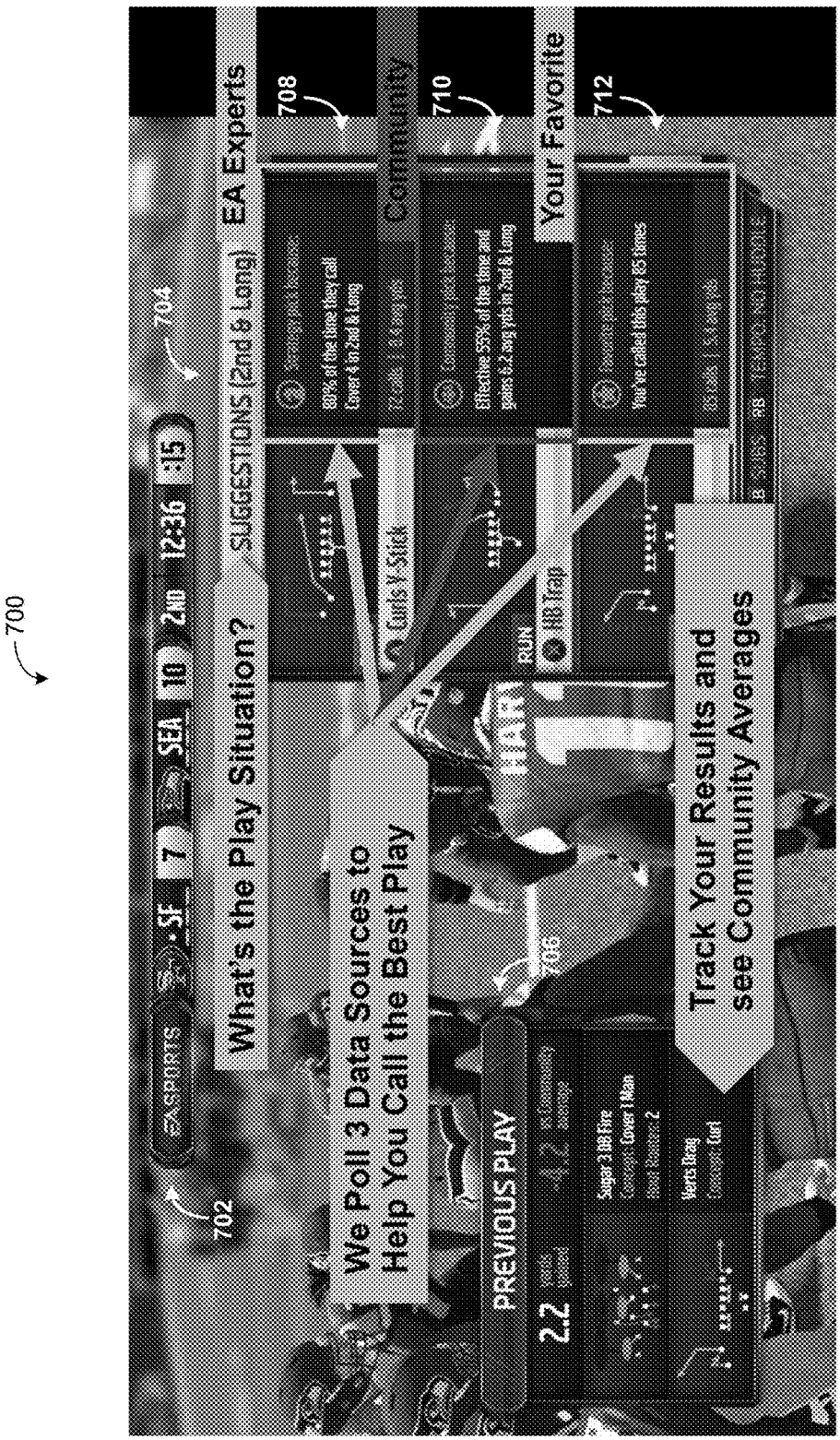
FIG. 7 is a screenshot of an example user interface for providing suggested playcalls in a video game in accordance with some embodiments of the present invention.

FIG. 7 is a screenshot 700 of an example user interface for providing suggested playcalls in a video game in accordance with some embodiments of the present invention. The screenshot 700 may be one presented to a human game player during a video game session involving a football video game. The screenshot 700 includes a football game situation bar 702, which can display latest situation in the football game being played. The screenshot 700 further includes a menu 704 configured to provide a set of one or more suggested playcalls based on at least a current game context (e.g., current situation in the football). As shown in FIG. 7, the menu 704 can include a set of playcalls 708 suggested based on usage by one or more expert level video game players (e.g., video game players having a high player rank), and further suggested based on the results of such playcalls (e.g., effectiveness of such playcalls). The menu 704 can include a set of playcalls 710 suggested based on usage by a community (e.g., online community) of video game players, and further suggested based on the results of such playcalls (e.g., effectiveness of such playcalls). The menu 704 can include a set of playcalls 712 suggested based on the human game players own usage of the suggested playcalls, and further suggested based on the results of such playcalls (e.g., effectiveness of such playcalls). Those skilled in the art will appreciate that for some embodiments, a set of suggested game strategies can be provided to a human player in a manner different from what is illustrated in FIG. 7. The manner in which a set of suggested game strategies are identified or provided may differ between different types of video games or different video game titles.

Figure 8:
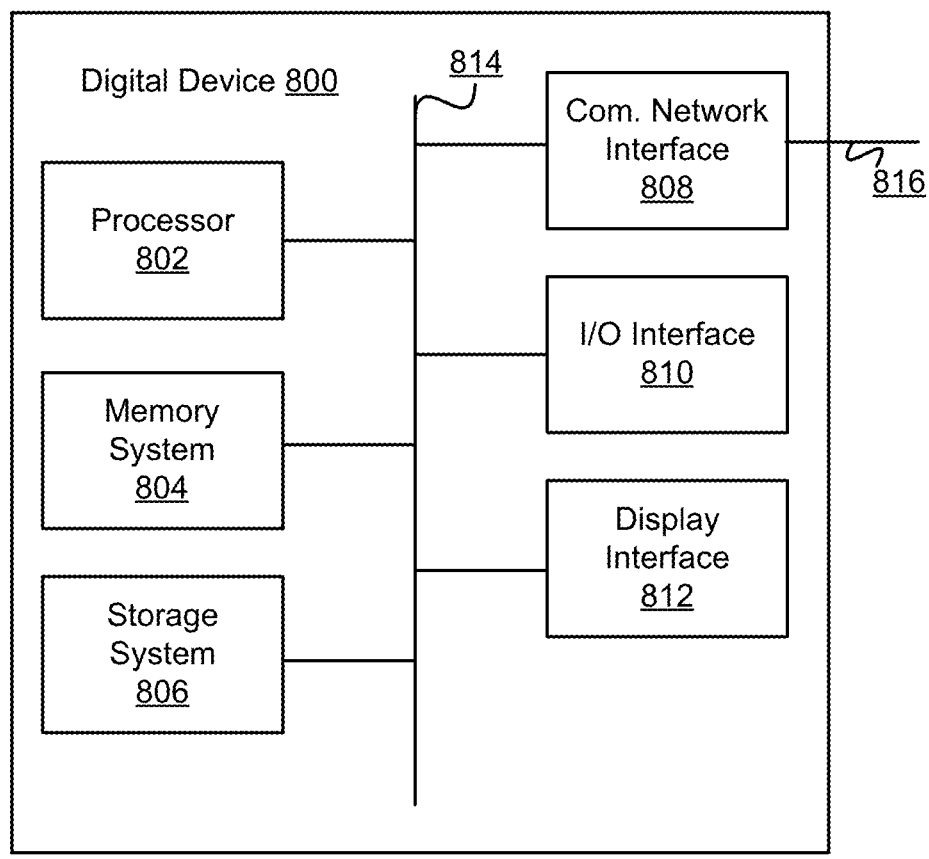
FIG. 8 is a block diagram of an exemplary digital device.

FIG. 8 is a block diagram of a computer system 800. The computer system 800 comprises a processor 802, a memory system 804, a storage system 806, a communication network interface 808, an I/O interface 810, and a display interface 812 communicatively coupled to a communication channel 814. The processor 802 is configured to execute executable instructions (e.g., code). In some embodiments, the processor 802 comprises circuitry and/or any processor capable of processing the executable instructions.

The memory system 804 is any memory configured to store data. Some examples of the memory system 804 include storage devices, such as RAM, ROM, RAM cache, etc. In various embodiments, data is stored within the memory system 804. The data within the memory system 804 may be cleared or ultimately transferred to the storage system 806.

The storage system 806 is any storage configured to retrieve and store data. Some examples of the storage system 806 are flash drives, hard drives, optical drives, and/or magnetic tape. In some embodiments, the computer system 800 includes a memory system 804 in the form of RAM and a storage system 806 in the form of flash. Both the memory system 804 and the storage system 806 comprise computer readable media that stores instructions that are executable by the processor 802.

The communication network interface (com. network interface) 808 can be coupled to a network (e.g., computer network 116) via the communication channel 816. The communication network interface 808 may support communication over an Ethernet connection, a serial connection, a parallel connection, or an ATA connection, for example. The communication network interface 808 may also support wireless communication (e.g., 802.11 a/b/g/n, WiMax). It will be apparent to those skilled in the art that the communication network interface 808 can support many wired and wireless standards.

The input/output (I/O) interface 810 is any device that receives input from the user and outputs data to the user. The display interface 812 is any device that is configured to output graphics and data to a display. In one example, the display interface 812 is a graphics adapter. It will be appreciated that not all computer systems 800 comprise either the I/O interface 810 or the display interface 812.

It will be appreciated by those skilled in the art that the hardware elements of the computer system 800 are not limited to those depicted. A computer system 800 may comprise more or less hardware elements than depicted. Further, hardware elements may share functionality and still be within various embodiments described herein. In one example, encoding and/or decoding may be performed by the processor 802 and/or a co-processor located on a GPU (e.g., Nvidia). The above-described functions and components may comprise instructions stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

It will be appreciated that a "module" as referred to herein may comprise software, hardware, firmware, and/or circuitry. In one example, one or more software programs comprising instructions capable of being executable by a processor may perform one or more of the functions of the engines described herein. In another example, circuitry may perform the same or similar functions. Alternative embodiments may comprise more, less, or functionally equivalent engines and still be within the scope of present embodiments.

It will also be understood that the term "set" as used herein may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Those skilled in the art will appreciate that for the various embodiments described herein, any communication of data between entities, such as the client device 102-1, the online video game network 106, and the game strategy system 108, may entail the exchange of a data file, which may include information in a structured format (e.g., XML or JSON).

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A computer-implemented method comprising:
as implemented by server computing system comprising at least one processor configured with computer-executable instructions,
receiving gameplay telemetry data from a client computing system executing a first gameplay session of a video game application, the gameplay telemetry data identifying a first gameplay context of the first gameplay session wherein the first game context comprises at least one of a first skill level of a first game player or a second skill level of a second game player;
accessing a game strategy dataset, wherein the gameplay strategy dataset includes a plurality of game strategies used in previous gameplay contexts aggregated from a plurality of client computing system during individual gameplay sessions of the video game application;
identifying a subset of one or more game strategies, from the gameplay strategy dataset, based, at least in part, on the first gameplay context of the first gameplay session; and
transmitting to the client computing system a dataset comprising the subset of one or more game strategies, the client computing system being configured to use the dataset to select at least one game strategy of the subset for use in the first gameplay context of the first gameplay session and generate instructions to output the at least one selected game strategy within a video game user interface during runtime of the first gameplay session.

2. The method of claim 1, wherein the at least one selected game strategy, in the subset of one of more game strategies, has an associated game context that is at least similar to the first gameplay context.

3. The method of claim 1, wherein identifying individual game strategies for the subset of one or more game strategies is further based, at least in part, on a result achieved during past use of an individual game strategy.

4. The method of claim 1, wherein identifying individual game strategies for the subset of one or more game strategies is further based, at least in part, on an effectiveness of an individual game strategy.

5. The method of claim 1, wherein identifying individual game strategies for the subset of one or more game strategies is further based, at least in part, on past use of the individual game strategy by a set of one or more video game players.

6. The method of claim 1, wherein identifying individual game strategies for the subset of one or more game strategies is further based, at least in part, on how often the individual game strategy has been used by other video game players.

7. The method of claim 1, wherein individual game strategies of the plurality of game strategies further include a set of one or more game results achieved during use of the first game strategy within a video game session.

8. The method of claim 1, wherein the video game application is a sports video game, a role-playing game (RPG), a real-time strategy (RTS) game, a simulation, a first person shooter (FPS) game, or an adventure game.

9. A system comprising:
a data store comprising a gameplay strategy dataset including a plurality of game strategies used in previous gameplay contexts aggregated from a plurality of client computing system during individual gameplay sessions of the video game application;
at least one processor configured with computer executable instructions, wherein the computer executable instructions configure the at least one processor to:
receive gameplay telemetry data from a client computing system executing a first gameplay session of a video game application, the gameplay telemetry data identifying a first gameplay context of the first gameplay session, wherein the first game context comprises at least one of a first skill level of a first game player or a second skill level of a second game player;
identify a subset of one or more game strategies, from the gameplay strategy dataset, based, at least in part, on the first gameplay context of the first gameplay session; and
transmit to the client computing system a dataset comprising the subset of one or more game strategies, the client computing system being configured to use the dataset to select at least one game strategy of the subset for use in the first gameplay context of the first gameplay session and generate instructions to output the at least one selected game strategy within a video game user interface during runtime of the first gameplay session.

10. The system of claim 9, wherein identifying individual game strategies for the subset of one or more game strategies is further based, at least in part, on a result achieved during past use of an individual game strategy.

11. The system of claim 9, wherein identifying individual game strategies for the subset of one or more game strategies is further based, at least in part, on an effectiveness of an individual game strategy.

12. The system of claim 9, wherein identifying individual game strategies for the subset of one or more game strategies is further based, at least in part, on past use of the individual game strategy by a set of one or more video game players.

13. The system of claim 9, wherein identifying individual game strategies for the subset of one or more game strategies is further based, at least in part, on how often the individual game strategy has been used by other video game players.

14. The system of claim 9, wherein individual game strategies of the plurality of game strategies data further include a set of one or more game results achieved during use of the first game strategy within a video game session.

15. A computer implemented method comprising:
as implemented by a client computing system comprising a processor configured with computer executable instructions executing a video game application,
transmit, to a server computing system, gameplay telemetry data during runtime execution of a first gameplay session of the video game application, the gameplay telemetry data identifying a first gameplay context of the gameplay session, wherein the first game context comprises at least one of a first skill level of a first game player or a second skill level of a second game player;
receiving, from the server computing system, a dataset comprising a subset of one or more game strategies, the subset of one or more gameplay strategies identified by the server computing system based, at least in part, on the first gameplay context of the first gameplay session; and
selecting at least one game strategy of the subset for use in the first gameplay context of the first gameplay session;
generating instructions to output the at least one game strategy within a video game user interface during runtime of the first gameplay session;
receiving a user selection of a first game strategy of the at least one game strategy; and
generating instructions to implement the first game strategy within the video game session.

16. The method of claim 15, wherein the gameplay telemetry data identifies a current game state experienced by a first game player and a second game player participating in the first gameplay session.

17. The method of claim 16, wherein the at least one game strategy is provided to the second game player, wherein the second game player is a computer game player.

18. The method of claim 17, wherein the computer game player automatically executes the at least one game strategy during the first gameplay session.

* * * * *